(12) United States Patent
Srinivasan et al.

(10) Patent No.: US 11,513,872 B2
(45) Date of Patent: Nov. 29, 2022

(54) SYSTEM AND AI PATTERN MODEL FOR ACTIONABLE ALERTS FOR EVENTS WITHIN A CHATOPS PLATFORM

(71) Applicant: KYNDRYL, INC., New York, NY (US)

(72) Inventors: Raghuram Srinivasan, Aurora, IL (US); Mauro Marzorati, Lutz, FL (US); Jeremy R. Fox, Georgetown, TX (US); Gary Francis Diamanti, Wake Forest, NC (US)

(73) Assignee: KYNDRYL, INC., New York, NY (US)

( * ) Notice: Subject to any disclaimer, the term of this patent is extended or adjusted under 35 U.S.C. 154(b) by 126 days.

(21) Appl. No.: 17/210,853

(22) Filed: Mar. 24, 2021

(65) Prior Publication Data

US 2022/0308943 A1 Sep. 29, 2022

(51) Int. Cl.
| | | |
|---|---|---|
| *G06F 9/54* | (2006.01) | |
| *H04L 51/02* | (2022.01) | |
| *G06F 40/40* | (2020.01) | |
| *G06K 9/62* | (2022.01) | |
| *G06N 20/00* | (2019.01) | |
| *G06V 10/75* | (2022.01) | |

(52) U.S. Cl.
CPC .............. *G06F 9/542* (2013.01); *G06F 40/40* (2020.01); *G06K 9/623* (2013.01); *G06K 9/6232* (2013.01); *G06N 20/00* (2019.01); *G06V 10/751* (2022.01); *H04L 51/02* (2013.01)

(58) Field of Classification Search
CPC ....... G06F 9/542; G06F 16/1734; G06N 3/00; G06N 3/086; H04L 41/06; H04L 41/0604

USPC ...................................... 719/318; 706/12, 13
See application file for complete search history.

(56) References Cited

U.S. PATENT DOCUMENTS

| | | | |
|---|---|---|---|
| 5,796,926 A | 8/1998 | Huffman | |
| 9,245,225 B2 | 1/2016 | Winn | |
| 9,847,084 B2 | 12/2017 | Gustafson | |
| (Continued) | | | |

FOREIGN PATENT DOCUMENTS

| | | |
|---|---|---|
| KR | 20180003324 A | 1/2018 |
| WO | 2019245943 A1 | 12/2019 |
| WO | 2020178856 A1 | 9/2020 |

*Primary Examiner* — Andy Ho
(74) *Attorney, Agent, or Firm* — Erik C. Swanson, Esq.; Blanche E. Schiller, Esq.; Heslin Rothenberg Farley & Mesiti P.C.

(57) ABSTRACT

In an approach for building a machine learning model that predicts the appropriate action to resolve a malfunction or system error, a processor receives an alert that a malfunction or a system error has occurred. A processor creates a workspace on a ChatOps platform integrated with a chatbot and one or more tools. A processor inputs data relating to the alert in a natural language format. A processor processes the data using a natural language processing algorithm. Responsive to determining a pre-set threshold for outputting the appropriate action is not met, a processor establishes a conversation between two or more support service agents in the workspace. A processor monitors the conversation using the natural language processing algorithm. A processor analyzes a transcript of the conversation using text analytics or pattern matching. A processor creates and trains a machine learning model to predict the appropriate action in future iterations.

20 Claims, 4 Drawing Sheets

(56) References Cited

U.S. PATENT DOCUMENTS

| | | |
|---|---|---|
| 10,276,170 B2 | 4/2019 | Gruber |
| 10,656,910 B2 | 5/2020 | Lenchner |
| 10,802,849 B1 | 10/2020 | Trim |
| 11,429,834 B1 * | 8/2022 | Xue et al. .............. G06N 3/006 |

* cited by examiner

SYSTEM AND AI PATTERN MODEL FOR ACTIONABLE ALERTS FOR EVENTS WITHIN A CHATOPS PLATFORM

BACKGROUND OF THE INVENTION

The present invention relates generally to the field of data processing, and more particularly to an artificial intelligence pattern model that outputs actionable alerts for events within a ChatOps platform.

The term ChatOps refers to a collaboration model that creates a workspace where people, tools, processes, and automation are connected in a seamless and transparent way. The workspace is managed by subject matter experts such as, for example, security, network, and infrastructure experts, developers, operators, system administrators, site reliability engineers, DevOps engineers, other IT personnel and consumers of IT business applications (hereinafter referred to as "support service agents"). In the workspace, the support service agents collaborate on the work that needs to be done, the work that is currently happening, and the work that has been done in one persistent location.

Additionally, the workspace is integrated with chatbots, development tools, operations tools, event management tools, service management tools, and other processes. With these tools and processes at their disposal, support service agents can manually enter one or more commands that the chatbots are configured to execute through a custom script and plugin or can select one or more command options provided in a drop-down or a menu within the workspace. Commands include, but are not limited to, acknowledging service management incidents, responding to security events, deploying code to production, and executing runbooks on systems.

The integration of the tools and processes in the workspace and the utilization of chatbots to execute commands enables a support service agent to start an automated task and to continue to collaborate with other support service agents while the task is being completed. This allows the support service agents to concentrate on solving the problem at hand without having to deal with disruptive context switches and lengthy hand-offs. In this type of environment, the support service agents are quite literally "on the same page" as it relates to an ongoing malfunction or system error.

A ChatOps platform is implemented in phases. In the first phase, two or more support service agent identify what the malfunction or system error is, what the root cause of the malfunction or system error is, and what the possible solutions to resolve the malfunction or system error are through conversation. Also, through conversation, support service agents agree on what is the appropriate response is. In the second phase, additional support service agents are added to the conversation and instructed on how to resolve the issue. In the conversation, support service agents share simple group messages as well as screen captures, videos of problems, and files such as log files, configuration files, or command outputs with the other support service agents.

When a major incident occurs, some ChatOps platforms are prepared to automatically create a channel and invite support service agents from a pre-selected assignment list to join the conversation. As the team evolves, the ChatOps platform provides two-way communications between the support service agents and the affected system or systems that the support service agents are managing. For example, a channel is created. In the channel, the support service agents have access to tools that permit the support service agents to see information regarding current issues such as, for example, a notification about an application deployment failure from the application's monitoring tool or a notification about regular usage metrics from the application's analytics tool. The support service agents can also see relevant information regarding previously resolved issues such as the final result of a production build from a continuous delivery pipeline or the final result of changes deployed to a server or an application.

SUMMARY

Aspects of an embodiment of the present invention disclose a method, computer program product, and computer system for building an analytic and predictive machine learning model that predicts the appropriate action the chatbot should perform automatically to resolve a malfunction or system error. A processor receives an alert that a malfunction or a system error has occurred. A processor creates a workspace on a ChatOps platform integrated with a chatbot and one or more tools. A processor inputs data relating to the alert that a malfunction or a system error has occurred in a natural language format. A processor processes the data using a natural language processing algorithm of the chatbot. A processor extracts one or more sequential patterns of events from the data. A processor records an occurrence of one or more sequential patterns of events from the data. A processor determines whether a pre-set threshold for outputting an actionable alert is met. Responsive to determining the pre-set threshold for outputting the actionable alert is not met, a processor establishes a conversation between two or more support service agents in the workspace on the ChatOps platform. A processor monitors the conversation using the natural language processing algorithm of the chatbot. A processor analyzes a transcript of the conversation occurring in the workspace on the ChatOps platform using text analytics or pattern matching. A processor documents one or more actions in the workspace on the ChatOps platform. A processor creates an analytic and predictive machine learning model to predict the actionable alert in future iterations. A processor trains the analytic and predictive machine learning model using one or more system generated events and one or more human generated events.

In some aspects of an embodiment of the present invention, the one or more tools comprises a development tool, an operations tool, an event management tool, and a service management tool.

In some aspects of an embodiment of the present invention, the data comprises user data, chat data, historical event metadata from the event management tool, and historical incident reports from the chatbots used in the service management tool.

In some aspects of an embodiment of the present invention, a processor compares the one or more sequential patterns of events from the data to the control data. A processor ranks the one or more sequential patterns of events from the data. A processor generates an actionable alert directing that the highest of the one or more sequential patterns of events be executed at the end point of the IT system. A processor outputs the actionable alert to the conversation occurring in the workspace on the ChatOps platform.

In some aspects of an embodiment of the present invention, the one or more actions documented in the workspace on the ChatOps platform includes what the malfunction or the system error was and what action was taken to resolve the malfunction or the system error.

In some aspects of an embodiment of the present invention, a processor collects one or more logs from a user computing device or from an application. A processor adds critical chat type content. A processor parses the one or more logs using scripts and utilities to remove low value content. A processor annotates the one or more logs with a root cause analysis finding. A processor creates a training dataset from the annotated logs. A processor creates a holdout set to test the analytic and predictive machine learning model.

In some aspects of an embodiment of the present invention, subsequent to training the analytic and predictive machine learning model using one or more system generated events and one or more human generated events, a processor tunes the analytic and predictive machine learning model using reinforcement learning. A processor stores the analytic and predictive machine learning model in a database.

DETAILED DESCRIPTION

Embodiments of the present invention recognize that information technology (hereinafter referred to as "IT") is critical to the operation of a business and has the power to catapult the growth of the business when utilized effectively.

Embodiments of the present invention recognize that a business with a computer and data processing system will need assistance in resolving malfunctions and system errors. Businesses use instant messaging applications as a workspace for system users to receive assistance from a support service agent to correct a malfunction or system error.

Embodiments of the present invention recognize that, in addition to using instant messaging applications as a workspace to receive assistance to correct malfunctions and system errors, businesses use instant messaging applications (e.g., Slack®) as a workspace to improve collaboration, task automation, and feedback loops. Instant messaging applications are replacing a significant amount of back-and-forth email communications and reducing the amount of time employees spend in meetings. More importantly, instant messaging applications go beyond basic communications. Instant messaging applications can provide context aware conversations and can ingest data from multiple sources.

Embodiments of the present invention provide a system and method to create a workspace on a ChatOps platform where support service agents, processes, tools, and automation are connected in a seamless and transparent way. Embodiments of the present invention monitor and document the conversation that occurs between two or more support service agents in the workspace on the ChatOps platform to identify and to resolve a malfunction or system error.

Embodiments of the present invention provide a system and method to build a model that predicts the appropriate action the chatbot should perform automatically to resolve the malfunction or system error. Embodiments of the present invention train the model to learn the correlations between a malfunction or system error and the actions performed by the support service agent to resolve the malfunction or system error using machine learning based on natural language processing.

Embodiments of the present invention further provide a system and method to provide the appropriate action to resolve the malfunction or system error. Embodiments of the present invention operates to use data inputted into a natural language processing algorithm of the chatbot to predict the appropriate action. Embodiments of the present invention operates to generate and output an actionable alert to the conversation in the workspace on the ChatOps platform for the chatbot to perform automatically.

Implementation of embodiments of the present invention may take a variety of forms, and exemplary implementation details are discussed subsequently with reference to the Figures.

Figure 1:
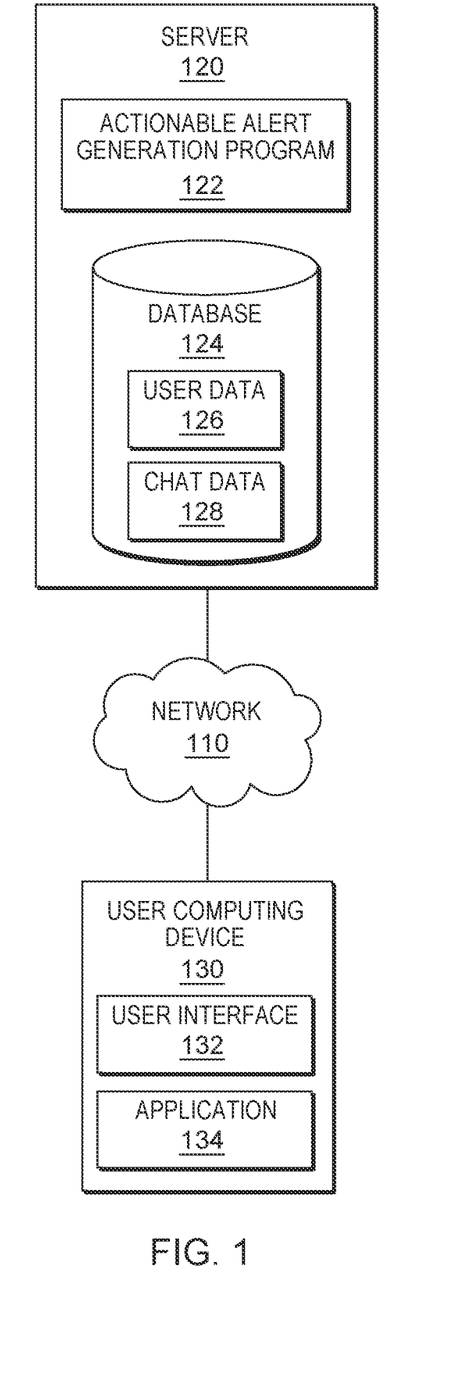
FIG. 1 is a functional block diagram illustrating a distributed data processing environment, in accordance with an embodiment of the present invention.

FIG. 1 is a functional block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 120, user computing device 130, and other computing devices (not shown) within distributed data processing environment 100.

Server 120 operates to run actionable alert generation program 122 and to send and/or store data (e.g., user data 126 and chat data 128) in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 4.

Actionable alert generation program 122 operates to create a workspace on a ChatOps platform where support service agents, processes, tools, and automation are connected in a seamless and transparent way. Actionable alert generation program 122 operates to monitor and document the conversation that occurs between two or more support service agents in the workspace on the ChatOps platform to identify and to resolve a malfunction or system error.

Actionable alert generation program 122 operates to build a model that predicts the appropriate action the chatbot should perform automatically to resolve the malfunction or system error. Actionable alert generation program 122 operates to train the model to learn the correlations between the malfunction or system error and the actions performed by the support service agent to resolve the malfunction or system error using machine learning based on natural language processing.

Actionable alert generation program 122 operates to provide the appropriate action to resolve the malfunction or system error. Actionable alert generation program 122 operates to use data inputted into a natural language processing algorithm of the chatbot to predict the appropriate action. Actionable alert generation program 122 operates to generate and output an actionable alert to the conversation in the workspace on the ChatOps platform for the chatbot to perform automatically.

In an embodiment, actionable alert generation program 122 is initiated after receiving an alert from an application (e.g., application 134) running on a user computing device that a malfunction or system error has occurred. For example, responsive to application 134 on user computing device 130 sending actionable alert generation program 122 an alert that a malfunction or system error has occurred, actionable alert generation program 122 begins.

In the depicted embodiment, actionable alert generation program 122 is a standalone program. In another embodiment, actionable alert generation program 122 may be integrated into another software product. In the depicted embodiment, actionable alert generation program 122 resides on server 120. In other embodiments, actionable alert generation program 122 may reside on user computing device 130 or on another computing device (not shown), provided that actionable alert generation program 122 has access to network 110.

Database 124 operates as a repository for data received, used, and/or generated by actionable alert generation program 122. A database is an organized collection of data. Data includes, but is not limited to, user data 126, chat data 128, historical event metadata from event management tools (e.g., IBM® Netcool® Operations Insights, AppDynamics®, Prometheus®), historical incident reports from chatbots used in service management tools (e.g., ServiceNow®), and any other data received, used, and/or generated by actionable alert generation program 122.

User data 126 is representative of aggregated data associated with users of a ChatOps platform. In an embodiment, user data 126 includes information associated with a user (e.g., user of user computing device 130) in messaging sessions (e.g., a user profile). In one or more embodiments, user data 126 includes, but is not limited, information provided by the user of user computing device 130 (e.g., during a registration process, etc.) and information derived from the user of user computing device 130 interacting with a chatbot in one or more chat discourses (e.g., derived through iterations of actionable alert generation program 122). In one or more embodiments, user data 126 includes a message history for the user of user computing device 130. In an embodiment, actionable alert generation program 122 can access and utilize information in user data 126, e.g., during a real-time chat discourse, in accordance with embodiments of the present invention.

Chat data 128 is representative of aggregated data associated with messaging sessions (i.e., chat discourses between support service agent(s) and chatbot(s) and/or chat discourses between two or more support service agents) on a messaging platform. In an embodiment, chat data 128 includes, but is not limited to, historical information derived from messaging sessions and historical actionable alerts. In an embodiment, actionable alert generation program 122 stores chat data 128 in a database (e.g., database 124) in response to concluding a messaging session. In an embodiment, actionable alert generation program 122 can access and utilize chat data 128, e.g., during a real-time chat discourse, in accordance with embodiments of the present invention.

Database 124 can be implemented with any type of device capable of storing data and configuration files that can be accessed and utilized by server 120, such as a hard disk drive, a database server, or a flash memory. In an embodiment, database 124 is accessed by actionable alert generation program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that actionable alert generation program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Actionable alert generation program 122 enables the authorized and secure processing of personal data.

Actionable alert generation program 122 provides informed consent, with notice of the collection of personal and/or confidential company data, allowing the user to opt-in or to opt-out of processing personal and/or confidential company data. Consent can take several forms. Opt-in consent can impose on the user the opportunity to take an affirmative action before personal and/or confidential company data is processed. Alternatively, opt-out consent can impose on the user the opportunity to take an affirmative action to prevent the processing of personal and/or confidential company data before personal and/or confidential company data is processed. Actionable alert generation program 122 provides information regarding personal and/or confidential company data and the nature (e.g., type, scope, purpose, duration, etc.) of the processing. Actionable alert generation program 122 provides the user with copies of stored personal and/or confidential company data. Actionable alert generation program 122 allows the correction or completion of incorrect or incomplete personal and/or confidential company data. Actionable alert generation program 122 allows for the immediate deletion of personal and/or confidential company data.

In an embodiment, the user of user computing device 130 can register with server 120 (e.g., via a corresponding application, such as application 134). For example, the user completes a registration process, provides information, and authorizes the collection and analysis (i.e., opts-in) of relevant data on identified computing devices, (e.g., user computing device 130) by server 120 (e.g., via actionable alert generation program 122). In various embodiments, a user can opt-in or opt-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In another embodiment, the user can define which forms of data server 120 can utilize in determining a malfunction or system error. In another embodiment, the user can opt-out of the determination and/or analysis of a malfunction or system error entirely. In such embodiments, the user can interact with chatbots in the messaging session normally (i.e., without assistance/interaction with actionable alert generation program 122). Such preferences can be stored as user data 126 in database 124.

User computing device 130 operates to run user interface 132 through which a user can interact with actionable alert generation program 122 on server 120. User computing device 130 also includes application 134. In an embodiment, user computing device 130 is a device that performs programmable instructions. For example, user computing device 130 may be an electronic device, such as laptop computer, a tablet computer, a netbook computer, a personal computer, a desktop computer, a smart phone, or any programmable electronic device capable of running user interface 132 and of communicating (i.e., sending and receiving data) with actionable alert generation program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132 and application 134. User computing device 130 may include components as described in further detail in FIG. 4.

User interface 132 operates as a local user interface between actionable alert generation program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from actionable alert generation program 122 to a user via network 110. User interface 132 can also display or present alerts including information (such as graphics, text, and/or sound) sent from actionable alert generation program 122 to a user via network 110. In an embodiment, user interface 132 is capable of sending and receiving data (i.e., to and from actionable alert generation program 122 via network 110, respectively).

Application 134 is representative of one or more applications (e.g., an application suite) that can operate on user computing device 130. In various example embodiments, application 134 can be an application that a user of user computing device 130 utilizes to establish a communication channel with the messaging platform associated with server 120 (e.g., a web browser, enterprise-specific messaging application, social media application, etc.). For example, application 134 is a web browser that the user of user computing device 130 utilizes to initiate a chat session with a customer support chatbot (i.e., in the messaging platform associated with server 120).

Figure 2:
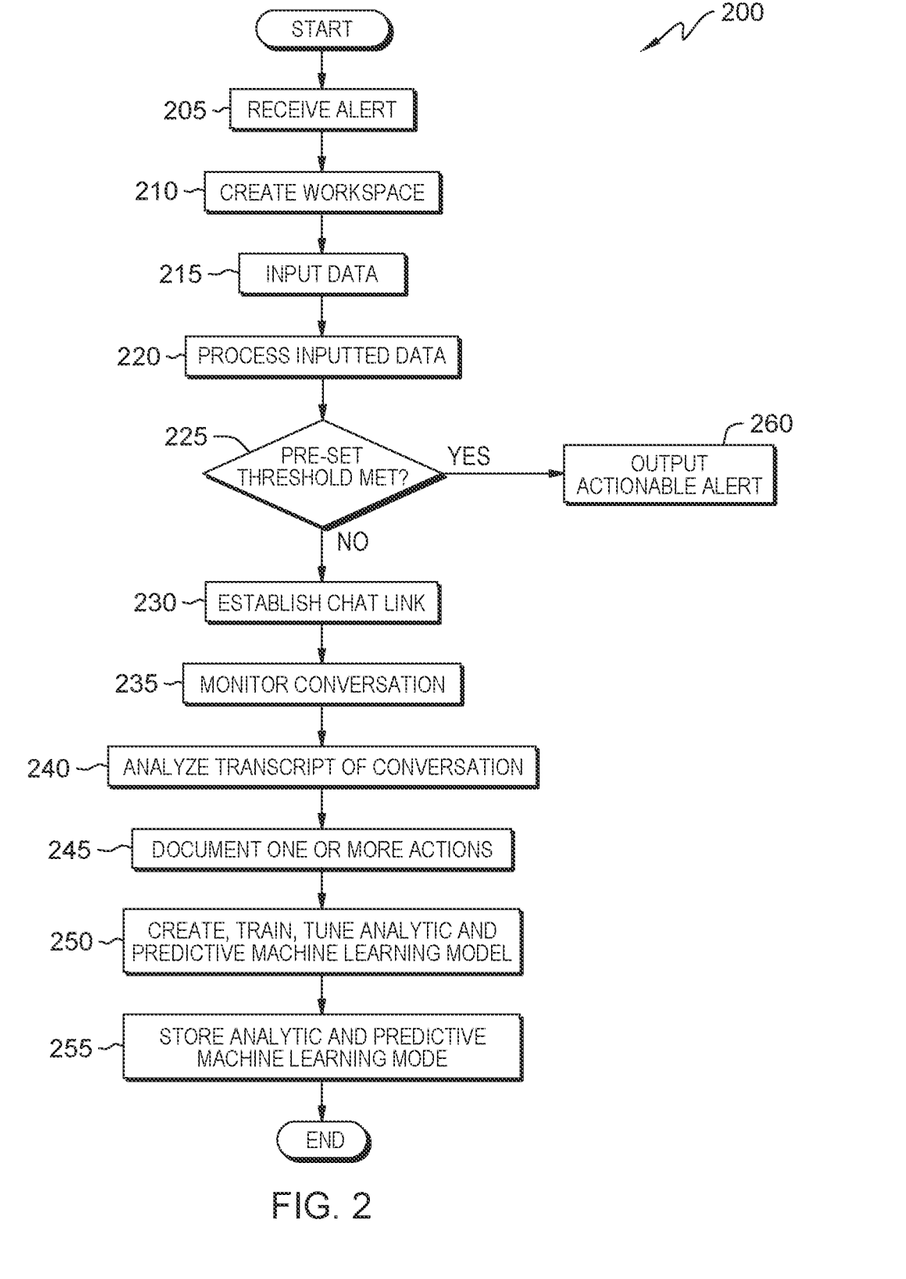
FIG. 2 is a flowchart illustrating the operational steps of an actionable alert generation program in a distributed data processing environment, such as the one depicted in FIG. 1, in accordance with an embodiment of the present invention.

FIG. 2 is a flowchart, generally designated 200, illustrating the operational steps of actionable alert generation program 122 on server 120 in distributed data processing environment 100 of FIG. 1, in accordance with an embodiment of the present invention. In an embodiment, actionable alert generation program 122 operates to create a workspace on a ChatOps platform where support service agents, processes, tools, and automation are connected in a seamless and transparent way. In an embodiment, actionable alert generation program 122 operates to monitor and document the conversation that occurs between two or more support service agents in the workspace on the ChatOps platform to identify and to resolve a malfunction or system error. In an embodiment, actionable alert generation program 122 operates to provide the appropriate action to resolve the malfunction or system error. In an embodiment, actionable alert generation program 122 operates to use data inputted into a natural language processing algorithm of the chatbot to predict the appropriate action. In an embodiment, actionable alert generation program 122 operates to generate and output an actionable alert to the conversation in the workspace on the ChatOps platform for the chatbot to perform automatically. It should be appreciated that the process depicted in FIG. 2 illustrates one possible iteration of actionable alert generation program 122, which may be repeated for each alert received by actionable alert generation program 122.

In step 205, actionable alert generation program 122 receives an alert. In an embodiment, actionable alert generation program 122 receives an alert from application 134. In an embodiment, actionable alert generation program 122 receives an alert when a threshold pre-set by application 134 is met. The alert indicates that a malfunction or system error has occurred.

For example, application 134 is an online banking application. In application 134, a user can set up an automatic monthly transfer of money from the user's checking account to the user's money market account. Application 134 monitors the automatic monthly transfers and detects for malfunctions or system errors. A threshold is pre-set by application 134. When the threshold is met, application 134 sends an alert to actionable alert generation program 122. In the middle of an automatic monthly transfer, the workflow malfunctions and the user's money is not transferred from the user's checking account to the user's money market account. This failure meets the threshold for application 134 to send an alert to actionable alert generation program 122, notifying actionable alert generation program 122 of the workflow malfunction.

In step 210, actionable alert generation program 122 creates a workspace. In an embodiment, actionable alert generation program 122 creates a workspace on a ChatOps platform (e.g., on a Slack® channel). In an embodiment, actionable alert generation program 122 integrates into the workspace on the ChatOps platform a chatbot that processes data using a natural language processing algorithm.

A chatbot is a computer program designed to stimulate an intelligent conversation with one or more system users, via auditory or textual methods. The chatbot can interpret a user's queries and/or requests and generate one or more responses. In an embodiment, the chatbot will generate a response based on keyword identification. That means, the chatbot will scan for key words within an incoming message and select a reply with the most matching key words, or the most similar word pattern, from a textual database. In one or more embodiments, the chatbot will generate a response using a natural language processing algorithm. That means, the chatbot will use natural language processing to translate the natural language input to generate responses based on machine learning constructs, such as supervised and/or unsupervised learning methods. Using these methods, a chatbot can interpret the natural language input and extract open and/or closed questions, sentiment, conference, ambiguity, text structures, summarizations, and other natural language processing tasks from text, speech, and/or images.

In an embodiment, actionable alert generation program 122 integrates into the workspace on the ChatOps platform one or more tools, including, but not limited to, a development tool, an operations tool, an event management tool, and a service management tool. In an embodiment, responsive to actionable alert generation program 122 receiving an alert, actionable alert generation program 122 creates a workspace.

For example, actionable alert generation program 122 receives an alert from application 134. Actionable alert generation program 122 triggers the event management tool, IBM® Netcool® Operations Insights, which in turn triggers the incident management platform, PagerDuty®. The incident management platform in turn creates an event in the service management tool, ServiceNow®. Application 134, IBM® Netcool® Operations Insights, PagerDuty®, and ServiceNow® are integrated together on a ChatOps platform.

In step 215, actionable alert generation program 122 inputs data. In an embodiment, actionable alert generation program 122 inputs data relating to the alert sent in step 205. Data includes, but is not limited to, user data 126, chat data 128, historical event metadata from event management tools (e.g., IBM® Netcool® Operations Insights, AppDynamics®, Prometheus®), historical incident reports from chatbots used in service management tools (e.g., ServiceNow®), and any other data received, used, and/or generated by actionable alert generation program 122. In an embodiment, actionable alert generation program 122 inputs data in natural language format (i.e., unstructured data). In an embodiment, actionable alert generation program 122 inputs data into the natural language processing algorithm of the chatbot. In an embodiment, responsive to actionable alert generation program 122 creating a workspace, actionable alert generation program 122 inputs data.

In step 220, actionable alert generation program 122 processes the inputted data. In an embodiment, actionable alert generation program 122 processes the inputted data to identify and to resolve a malfunction or system error. In an embodiment, actionable alert generation program 122 processes the data using the natural language processing algorithm of the chatbot. In an embodiment, actionable alert generation program 122 extracts one or more sequential patterns of events from the inputted data. In an embodiment, actionable alert generation program 122 records the number of occurrences of the one or more sequential pattern of events. In an embodiment, actionable alert generation program 122 records the component in which the one or more sequential pattern of events was found. In an embodiment, responsive to actionable alert generation program 122 inputting data, actionable alert generation program 122 processes the inputted data.

In decision 225, actionable alert generation program 122 determines whether a pre-set threshold has been met. In an embodiment, actionable alert generation program 122 determines whether pre-set threshold for outputting an actionable alert has been met. In an embodiment, actionable alert generation program 122 compares the one or more sequential pattern of events to control data. Chat data 128 is used as control data. In an embodiment, actionable alert generation program 122 ranks the one or more sequential pattern of events according to how similar the one or more sequential pattern of events is to the control data. The highest ranked sequential pattern of events recorded the highest number of occurrences and is the most similar to the control data, whereas the lowest ranked sequential pattern of events recorded the lowest number of occurrences and is the least similar to the control data. In an embodiment, actionable alert generation program 122 generates an actionable alert directing that the highest ranked sequential pattern of events be executed at the end point of the IT system. In an embodiment, responsive to actionable alert generation program 122 processing the inputted data, actionable alert generation program 122 determines whether a pre-set threshold has been met.

If actionable alert generation program 122 determines the pre-set threshold has been met (decision 225, YES branch), then actionable alert generation program 122 outputs the actionable alert to the conversation occurring in the workspace on the ChatOps platform (step 260).

In step 260, actionable alert generation program 122 outputs the actionable alert. In an embodiment, actionable alert generation program 122 outputs the actionable alert to the conversation occurring in the workspace on the ChatOps platform. In an embodiment, actionable alert generation program 122 outputs the actionable alert directing the chatbot to automatically execute the highest ranked sequential pattern of events at the end point of the IT system. In an embodiment, responsive to actionable alert generation program 122 determining a pre-set threshold has been met (decision 225, YES branch), actionable alert generation program 122 outputs an actionable alert.

Returning to decision 225, if actionable alert generation program 122 determines the pre-set threshold has not been met (decision 225, NO branch), then actionable alert generation program 122 proceeds to step 230, establishing a chat link. In step 230, actionable alert generation program 122 establishes a chat link. In an embodiment, actionable alert generation program 122 establishes a chat link between one or more support service agents. In an embodiment, actionable alert generation program 122 establishes a chat link between one or more support service agents in the workspace on the ChatOps platform. In an embodiment, actionable alert generation program 122 provides the support service agents with data including, but not limited to, user data 126, chat data 128, historical event metadata from event management tools (e.g., IBM® Netcool® Operations Insights, AppDynamics®, Prometheus®), historical incident reports from chatbots used in service management tools (e.g., ServiceNow®), and any other data received, used, and/or generated by actionable alert generation program 122. In an embodiment, responsive to actionable alert generation program 122 determining a pre-set threshold has not been met (decision 225, NO branch), actionable alert generation program 122 establishes a chat link.

For example, actionable alert generation program 122 determines the pre-set threshold has not been met. Actionable alert generation program 122 establishes a chat link between two support service agents in the workspace on the ChatOps platform (e.g., on the Slack® channel). In the workspace, the support service agents review data including, but not limited to, user data 126, chat data 128, historical event metadata from event management tools (e.g., IBM® Netcool® Operations Insights, AppDynamics®, Prometheus®), historical incident reports from chatbots used in service management tools (e.g., ServiceNow®), and any other data received, used, and/or generated by actionable alert generation program 122. The support service agents take action to resolve the malfunction using the integrated development tools, operations tools, event management tools, and service management tools.

In step 235, actionable alert generation program 122 monitors the conversation. In an embodiment, actionable alert generation program 122 monitors the conversation occurring in the workspace on the ChatOps platform. In an embodiment, actionable alert generation program 122 monitors the conversation occurring in the workspace on the ChatOps platform between the support service agents. In an embodiment, actionable alert generation program 122 monitors the conversation in real time. In an embodiment, actionable alert generation program 122 monitors the conversation using the natural language processing algorithm of the chatbot. In an embodiment, responsive to actionable alert generation program 122 establishing a chat link, actionable alert generation program 122 monitors the conversation.

In step 240, actionable alert generation program 122 analyzes the transcript of the conversation. In an embodiment, actionable alert generation program 122 analyzes the transcript of the conversation to infer what the malfunction or system error is and what actions need to be executed in order to resolve the malfunction or system error. In an embodiment, actionable alert generation program 122 analyzes the transcript of the conversation using text analytics. Text analytics uses advanced linguistic technologies and natural language processing to rapidly process a large variety of unstructured and semi-structured text data and, from this text data, extract and organize the key concepts into categories. In one or more embodiments, actionable alert generation program 122 analyzes the transcript of the conversation using pattern matching. Pattern matching is an algorithmic task that finds pre-determined patterns among sequences of raw data or processed tokens. In an embodiment, responsive to actionable alert generation program 122 monitoring the conversation, actionable alert generation program 122 analyzes the transcript of the conversation.

For example, once the support service agents accept the invitation to join the conversation occurring in the workspace on the ChatOps platform (e.g., on the Slack® channel), the support service agents review the event details and document on the Slack® channel what the support service agents infer the malfunction to be as well as what actions need to be taken in order to fix the malfunction. Actionable alert generation program 122 monitors the conversation between the support service agents in real time. While monitoring the conversation, actionable alert generation program 122 analyzes the transcript of the conversation. With the tools integrated in the Slack® channel, the support service agents can update the incident ticket directly within the Slack® channel as the support service agents fix the malfunction. Actionable alert generation program 122 monitors the updates the support service agents make.

In step 245, actionable alert generation program 122 documents one or more actions. In an embodiment, actionable alert generation program 122 documents the one or more actions in the workspace on the ChatOps platform. In an embodiment, actionable alert generation program 122 documents what the malfunction or system error was. In one or more embodiments, actionable alert generation program 122 documents the comparison of chat data 128 to the one or more sequential pattern of events from step 220. In one or more embodiments, actionable alert generation program 122 documents the rankings of the one or more sequential pattern of events from step 220. In one or more embodiments, actionable alert generation program 122 documents what actions needed to be taken to resolve the malfunction or system error. In an embodiment, actionable alert generation program 122 stores the one or more actions in a database, e.g., database 124. In an embodiment, responsive to actionable alert generation program 122 analyzing the transcript of the conversation, actionable alert generation program 122 documents one or more actions.

In step 250, actionable alert generation program 122 creates, trains, and tunes a machine learning model. In an embodiment, actionable alert generation program 122 creates, trains, and tunes a machine learning model that can predict the appropriate action the chatbot should perform automatically to resolve the malfunction or system error. The machine learning model will hereinafter be referred to as the "analytic and predictive machine learning model". Step 250 is described in further detail with respect to flowchart 300 in FIG. 3. In an embodiment, responsive to actionable alert generation program 122 documenting the actions, actionable alert generation program creates, trains, and tunes a machine learning model.

For example, actionable alert generation program 122 creates an analytic and predictive machine learning model and then trains the model to learn the manual actions taken by the support service agents as they relate to the malfunctions or system errors that were generated as alerts.

In step 255, actionable alert generation program 122 stores the analytic and predictive machine learning model. In an embodiment, actionable alert generation program 122 stores the analytic and predictive machine learning model in a database, e.g., database 124. In an embodiment, responsive to actionable alert generation program 122 creating, training, and tuning a machine learning model, actionable alert generation program 122 stores the analytic and predictive machine learning model.

Figure 3:
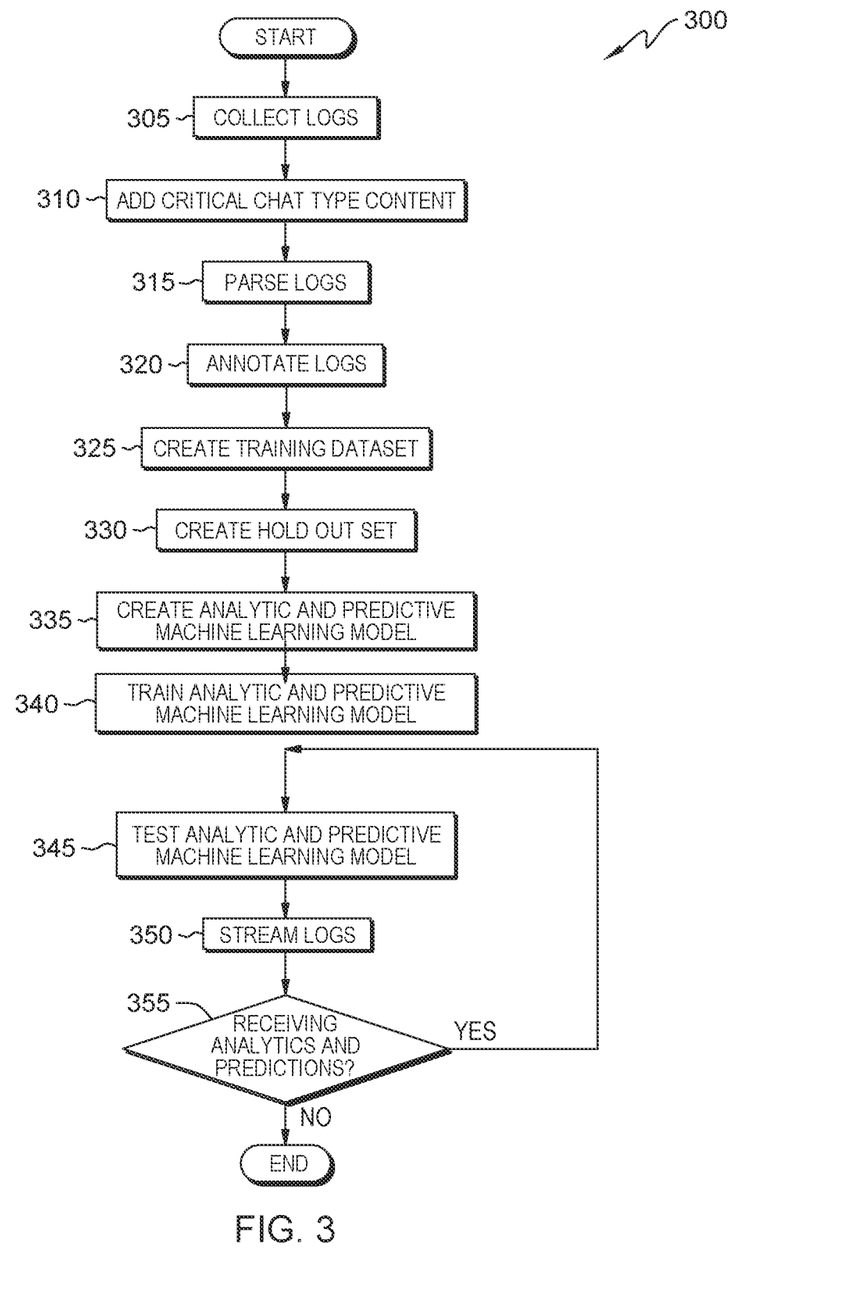
FIG. 3 is a flowchart illustrating the operational steps of an analytic and predictive machine learning model creation component of an actionable alert generation program in a distributed data processing environment, such as the one depicted in FIG. 1, in accordance with an embodiment of the present invention.

FIG. 3 is a flowchart, generally designated 300, illustrating, in greater detail, the operational steps of analytic and predictive machine learning model creation step 250 of actionable alert generation program 122 in distributed data processing environment 100 of FIG. 1, in accordance with an embodiment of the present invention. In an embodiment, actionable alert generation program 122 operates to build an analytic and predictive machine learning model that predicts the appropriate action the chatbot should perform automatically to resolve the malfunction or system error. In an embodiment, actionable alert generation program 122 operates to train the model to learn the correlations between the malfunction or system error and the actions performed by the support service agent to resolve the malfunction or system error using machine learning based on natural language processing. It should be appreciated that the process depicted in FIG. 3 illustrates one possible iteration of analytic and predictive machine learning model creation step 250 of actionable alert generation program 122.

In step 305, actionable alert generation program 122 collects logs. In an embodiment, actionable alert generation program 122 collects critical logs (i.e., logs of events that indicate a serious error is occurring and is causing the system or a system component to cease functioning). In one or more embodiments, actionable alert generation program 122 collects error logs (i.e., logs of events that indicate an error is occurring that is causing the system or a system component to operate in a degraded state), warning logs (i.e., logs of events that can indicate a potential problem), unusual logs (i.e., logs of events that are unusual and might need to be investigated), informational logs (i.e., logs of informational events), and/or debug logs (i.e., logs of all events regardless of severity).

In an embodiment, actionable alert generation program 122 collects logs from user computing device 130. In one or more embodiments, actionable alert generation program 122 collects logs from application 134. In an embodiment, actionable alert generation program 122 collects logs in order to create a training corpus. A training corpus is a collection of authentic text and audio data organized into one or more datasets. The text and audio data are required to be in an unstructured format for training purposes. The text and audio data are also required to be a representative sample and to contain a variety of examples of entity types and relation types. In the early stages of development, the training corpus has only a small amount of data. As the human annotator matures, the amount of data added to the training corpus also increases. After a certain period of time (e.g., days, weeks, months, etc.) has passed, new experiences from the human annotator are incorporated by the subsequent addition of new data to the training corpus, thereby increasing the maturity of the training corpus on a continual basis.

In step 310, actionable alert generation program 122 adds critical chat type content. In an embodiment, actionable alert generation program 122 adds critical chat type content to the training corpus. Critical chat type content includes, but is not limited to, sessions on messaging platforms (e.g., on Slack® channels), digital triage meeting details, and root cause analysis findings. Root cause analysis is the search for the primary, sufficient condition that causes a problem. A root cause analysis finding is the result of the off-line review of the datums from previous incidents and is representative of the distilling of the experiences gained by the support service agents. In an embodiment, responsive to actionable alert generation program 122 collecting critical logs, actionable alert generation program 122 adds critical chat type content.

In step 315, actionable alert generation program 122 parses the logs. In an embodiment, actionable alert generation program 122 parses the logs in order to remove low value content. Low value content includes, but is not limited to, headers, no value indicators, and error messages. By removing the low value content, all outdated, incorrect, or irrelevant data is eliminated and a training corpus with the highest quality and most reliable information is created. In an embodiment, actionable alert generation program 122 parses the logs using scripts and utilities. In an embodiment, responsive to actionable alert generation program 122 adding critical chat type content, actionable alert generation program 122 parses the logs.

In step 320, actionable alert generation program 122 annotates the logs. Annotation is the processing of enhancing and augmenting the training corpus with higher-level information. Adding annotated data to the training corpus enables the machine to recognize patterns when presented with new, unannotated data. In an embodiment, actionable alert generation program 122 annotates the logs with the root cause analysis findings. In an embodiment, responsive to actionable alert generation program 122 parsing the logs, actionable alert generation program 122 annotates the logs.

For example, a message received from the event management tool states that the online banking transfer from checking to the money market failed. Root cause analysis finds that transfer failed because of an internal server error. Actionable alert generation program 122 ties the message received to the internal server error. Actionable alert generation program annotates the logs with the root cause analysis finding.

In step 325, actionable alert generation program 122 creates a training dataset. In an embodiment, actionable alert generation program 122 creates a training dataset using the annotated logs from step 320. In an embodiment, actionable alert generation program 122 creates a training dataset representative of data the analytic and predictive machine learning model will ingest to determine what action should be executed at the end point of the IT system in step 260 to resolve the malfunction or system error. In an embodiment, responsive to actionable alert generation program 122 annotating the logs, actionable alert generation program 122 creates a training dataset.

In step 330, actionable alert generation program 122 creates a holdout set. In an embodiment, actionable alert generation program 122 creates a holdout set to test the analytic and predictive machine learning model. In an embodiment, responsive to actionable alert generation program 122 creating a machine learning training dataset, actionable alert generation program 122 creates a holdout set.

In step 335, actionable alert generation program 122 creates an analytic and predictive machine learning model. In an embodiment, actionable alert generation program 122 creates an analytic and predictive machine learning model using the machine learning training dataset. In an embodiment, responsive to actionable alert generation program 122 creating a holdout set, actionable alert generation program 122 creates an analytic and predictive machine learning model.

In step 340, actionable alert generation program 122 trains the analytic and predictive machine learning model. In an embodiment, actionable alert generation program 122 trains the analytic and predictive machine learning model using system generated events and human generated events. System generated events and human generated events include, but are not limited to, error codes and message patterns. In an embodiment, responsive to creating an analytic and predictive machine learning model, actionable alert generation program 122 trains the analytic and predictive machine learning model.

In step 345, actionable alert generation program 122 tests the analytic and predictive machine learning model. In an embodiment, actionable alert generation program 122 tests the analytic and predictive machine learning model using the holdout set. In an embodiment, actionable alert generation program 122 tunes the analytic and predictive machine model using reinforcement learning. In an embodiment, responsive to actionable alert generation program 122 training the analytic and predictive machine learning model, actionable alert generation program 122 tests the analytic and predictive machine learning model.

In step 350, actionable alert generation program 122 streams the logs. In an embodiment, actionable alert generation program 122 streams the logs to the endpoint of the machine learning model. In an embodiment, actionable alert generation program 122 streams the logs to the endpoint of the machine learning model in order to receive analytics and predictions. In an embodiment, responsive to testing the analytic and predictive machine learning model, actionable alert generation program 122 streams the logs to the machine learning model's endpoints.

In decision 355, actionable alert generation program 122 determines whether any analytics and/or predictions are being sent and received. In an embodiment, actionable alert generation program 122 determines whether any analytics and/or predictions are being sent and received in order to determine whether the process of tuning the analytic and predictive machine learning model continues. In an embodiment, responsive to actionable alert generation program 122 streaming the logs, actionable alert generation program 122 determines whether any analytics and/or predictions are being sent and received.

If actionable alert generation program 122 determines analytics and/or predictions are being sent and received (decision 355, YES branch), then actionable alert generation program 122 continues to annotate the high value content and to tune the analytic and predictive machine learning model models (step 345). If actionable alert generation program 122 determines analytics and/or predictions are not being sent and received (decision 355, NO branch), then actionable alert generation program 122 ends.

Figure 4:
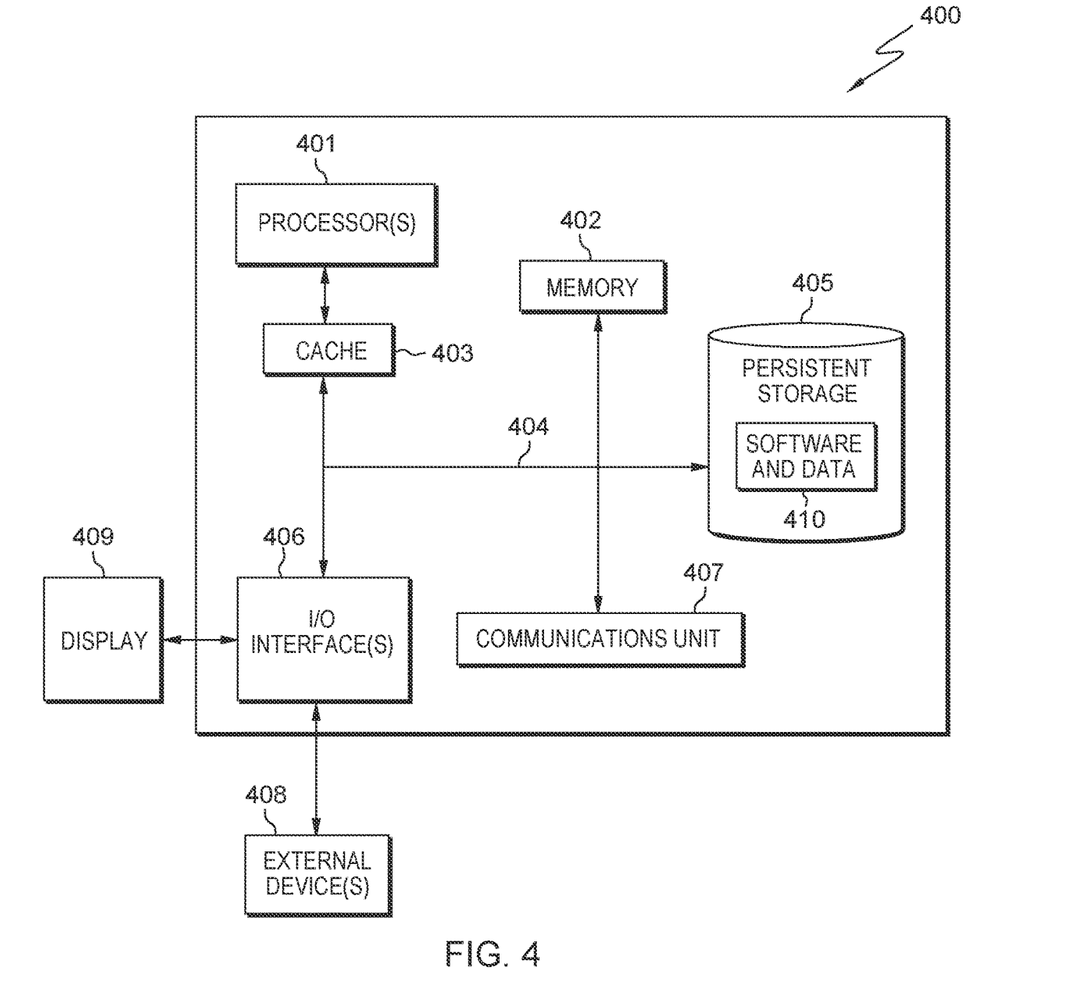
FIG. 4 is a block diagram illustrating the components of a computing device in the distributed data processing environment such as the one depicted in FIG. 1, in accordance with an embodiment of the present invention.

FIG. 4 is a block diagram illustrating the components of computer system 400, suitable for server 120 and/or user computing device 130 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computer system 400 includes processor(s) 401, memory 402, cache 403, communications fabric 404, persistent storage 405, input/output (I/O) interface(s) 406, and communications unit 407.

Communications fabric 404 provides communications between memory 402, cache 403, persistent storage 405, input/output (I/O) interface(s) 406, and communications unit 407. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a cross switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to user computing device 130, software and data 410 includes user interface 132 and application 134. With respect to server 120, software and data 410 includes actionable alert generation program 122, user data 126, and chat data 128.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, an alert that a malfunction or a system error has occurred;
creating, by one or more processors, a workspace on a ChatOps platform integrated with a chatbot and one or more tools;
inputting, by one or more processors, data relating to the alert that the malfunction or the system error has occurred in a natural language format;
processing, by one or more processors, the data using a natural language processing algorithm of the chatbot;
extracting, by one or more processors, one or more sequential patterns of events from the data;
recording, by one or more processors, an occurrence of the one or more sequential patterns of events from the data;
determining, by one or more processors, whether a pre-set threshold for outputting an actionable alert is met;
responsive to determining the pre-set threshold for outputting the actionable alert is not met, establishing, by one or more processors, a conversation between two or more support service agents in the workspace on the ChatOps platform;
monitoring, by one or more processors, the conversation using the natural language processing algorithm of the chatbot;
analyzing, by one or more processors, a transcript of the conversation occurring in the workspace on the ChatOps platform using text analytics or pattern matching;
documenting, by one or more processors, one or more actions in the workspace on the ChatOps platform;
creating, by one or more processors, an analytic and predictive machine learning model to predict the actionable alert in future iterations; and training, by one or more processors, the analytic and predictive machine learning model using one or more system generated events and one or more human generated events.

2. The computer-implemented method of claim 1, wherein the one or more tools comprises:
a development tool, an operations tool, an event management tool, and a service management tool.

3. The computer-implemented method of claim 2, wherein the data comprises:
user data, chat data, historical event metadata from the event management tool, and historical incident reports from the chatbots used in the service management tool.

4. The computer-implemented method of claim 1, wherein determining whether the pre-set threshold for outputting the actionable alert is met further comprises:
comparing, by one or more processors, the one or more sequential patterns of events from the data to control data;
ranking, by one or more processors, the one or more sequential patterns of events from the data;
generating, by one or more processors, the actionable alert directing that the highest of the one or more sequential patterns of events be executed at the end point of an IT system; and
outputting, by one or more processors, the actionable alert to the conversation occurring in the workspace on the ChatOps platform.

5. The computer-implemented method of claim 1, wherein the one or more actions documented in the workspace on the ChatOps platform includes what the malfunction or the system error was and what action was taken to resolve the malfunction or the system error.

6. The computer-implemented method of claim 1, wherein creating the analytic and predictive machine learning model further comprises:
collecting, by one or more processors, one or more logs from a user computing device or from an application;
adding, by one or more processors, critical chat type content;
parsing, by one or more processors, the one or more logs using scripts and utilities to remove low value content;
annotating, by one or more processors, the one or more logs with a root cause analysis finding;
creating, by one or more processors, a training dataset from the one or more logs; and
creating, by one or more processors, a holdout set to test the analytic and predictive machine learning model.

7. The computer-implemented method of claim 1, further comprising:
subsequent to training the analytic and predictive machine learning model using the one or more system generated events and the one or more human generated events, tuning, by one or more processors, the analytic and predictive machine learning model using reinforcement learning; and
storing, by one or more processors, the analytic and predictive machine learning model in a database.

8. A computer program product comprising:
one or more computer readable storage media and program instructions stored on the one or more computer readable storage media, the program instructions comprising:
program instructions to receive an alert that a malfunction or a system error has occurred;

program instructions to create a workspace on a ChatOps platform integrated with a chatbot and one or more tools;
program instructions to input data relating to the alert that the malfunction or the system error has occurred in a natural language format;
program instructions to process the data using a natural language processing algorithm of the chatbot;
program instructions to extract one or more sequential patterns of events from the data;
program instructions to record an occurrence of the one or more sequential patterns of events from the data;
program instructions to determine whether a pre-set threshold for outputting an actionable alert is met;
responsive to determining the pre-set threshold for outputting the actionable alert is not met, program instructions to establish a conversation between two or more support service agents in the workspace on the ChatOps platform;
program instructions to monitor the conversation using the natural language processing algorithm of the chatbot;
program instructions to analyze a transcript of the conversation occurring in the workspace on the ChatOps platform using text analytics or pattern matching;
program instructions to document one or more actions in the workspace on the ChatOps platform;
program instructions to create an analytic and predictive machine learning model to predict the actionable alert in future iterations; and
program instructions to train the analytic and predictive machine learning model using one or more system generated events and one or more human generated events.

9. The computer program product of claim 8, wherein the one or more tools comprises:
a development tool, an operations tool, an event management tool, and a service management tool.

10. The computer program product of claim 9, wherein the data comprises:
user data, chat data, historical event metadata from the event management tool, and historical incident reports from the chatbots used in the service management tool.

11. The computer program product of claim 8, wherein determining whether the pre-set threshold for outputting the actionable alert is met further comprises:
program instructions to compare the one or more sequential patterns of events from the data to control data;
program instructions to rank the one or more sequential patterns of events from the data;
program instructions to generate the actionable alert directing that the highest of the one or more sequential patterns of events be executed at the end point of an IT system; and
program instructions to output the actionable alert to the conversation occurring in the workspace on the ChatOps platform.

12. The computer program product of claim 8, wherein the one or more actions documented in the workspace on the ChatOps platform includes what the malfunction or the system error was and what action was taken to resolve the malfunction or the system error.

13. The computer program product of claim 8, wherein creating the analytic and predictive machine learning model further comprises:
program instructions to collect one or more logs from a user computing device or from an application;
program instructions to add critical chat type content;
program instructions to parse the one or more logs using scripts and utilities to remove low value content;
program instructions to annotate the one or more logs with a root cause analysis finding;
program instructions to create a training dataset from the one or more logs; and
program instructions to create a holdout set to test the analytic and predictive machine learning model.

14. The computer program product of claim 8, further comprising:
subsequent to training the analytic and predictive machine learning model using the one or more system generated events and the one or more human generated events, program instructions to tune the analytic and predictive machine learning model using reinforcement learning; and
program instructions to store the analytic and predictive machine learning model in a database.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive an alert that a malfunction or a system error has occurred;
program instructions to create a workspace on a ChatOps platform integrated with a chatbot and one or more tools;
program instructions to input data relating to the alert that the malfunction or the system error has occurred in a natural language format;
program instructions to process the data using a natural language processing algorithm of the chatbot;
program instructions to extract one or more sequential patterns of events from the data;
program instructions to record an occurrence of the one or more sequential patterns of events from the data;
program instructions to determine whether a pre-set threshold for outputting an actionable alert is met;
responsive to determining the pre-set threshold for outputting the actionable alert is not met, program instructions to establish a conversation between two or more support service agents in the workspace on the ChatOps platform;
program instructions to monitor the conversation using the natural language processing algorithm of the chatbot;
program instructions to analyze a transcript of the conversation occurring in the workspace on the ChatOps platform using text analytics or pattern matching;
program instructions to document one or more actions in the workspace on the ChatOps platform;
program instructions to create an analytic and predictive machine learning model to predict the actionable alert in future iterations; and
program instructions to train the analytic and predictive machine learning model using one or more system generated events and one or more human generated events.

16. The computer system of claim 15, wherein the one or more tools comprises:
a development tool, an operations tool, an event management tool, and a service management tool.

17. The computer system of claim 16, wherein the data comprises:
  user data, chat data, historical event metadata from the event management tool, and historical incident reports from the chatbots used in the service management tool.

18. The computer system of claim 15, wherein determining whether the pre-set threshold for outputting the actionable alert is met further comprises:
  program instructions to compare the one or more sequential patterns of events from the data to control data;
  program instructions to rank the one or more sequential patterns of events from the data;
  program instructions to generate the actionable alert directing that the highest of the one or more sequential patterns of events be executed at the end point of an IT system; and
  program instructions to output the actionable alert to the conversation occurring in the workspace on the ChatOps platform.

19. The computer system of claim 15, wherein creating the analytic and predictive machine learning model further comprises:
  program instructions to collect one or more logs from a user computing device or from an application;
  program instructions to add critical chat type content;
  program instructions to parse the one or more logs using scripts and utilities to remove low value content;
  program instructions to annotate the one or more logs with a root cause analysis finding;
  program instructions to create a training dataset from the one or more logs; and
  program instructions to create a holdout set to test the analytic and predictive machine learning model.

20. The computer system of claim 15, further comprising:
  subsequent to training the analytic and predictive machine learning model using the one or more system generated events and the one or more human generated events, program instructions to tune the analytic and predictive machine learning model using reinforcement learning; and
  program instructions to store the analytic and predictive machine learning model in a database.

* * * * *